United States Patent
Bolms et al.

(10) Patent No.: US 7,246,993 B2
(45) Date of Patent: Jul. 24, 2007

(54) COOLABLE SEGMENT FOR A TURBOMACHINE AND COMBUSTION TURBINE

(75) Inventors: Hans-Thomas Bolms, Mülheim (DE); Andreas Heselhaus, Düsseldorf (DE); Bernhard Hoffschmidt, Bergisch Gladbach (DE)

(73) Assignee: Siemens Aktiengesellschaft, Munich (DE)

( * ) Notice: Subject to any disclaimer, the term of this patent is extended or adjusted under 35 U.S.C. 154(b) by 189 days.

(21) Appl. No.: 10/756,671

(22) Filed: Jan. 13, 2004

(65) Prior Publication Data

US 2004/0146399 A1    Jul. 29, 2004

(30) Foreign Application Priority Data

Jul. 13, 2001   (GB) ................. 0117110.7

(51) Int. Cl.
*F01D 25/12* (2006.01)
*F01D 11/08* (2006.01)

(52) U.S. Cl. .................. 415/116; 415/178; 415/173.1; 415/175

(58) Field of Classification Search ........ 415/115–117, 415/173.1, 173.2, 175–178; 165/168–169, 165/907; 60/754–755, 757
See application file for complete search history.

(56) References Cited

U.S. PATENT DOCUMENTS

| | | | |
|---|---|---|---|
| 3,728,039 A * | 4/1973 | Plemmons et al. ......... 415/115 |
| 3,800,864 A * | 4/1974 | Hauser et al. ............. 415/115 |
| 3,825,364 A | 7/1974 | Halila et al. |
| 4,004,056 A | 1/1977 | Carroll |
| 4,055,705 A * | 10/1977 | Stecura et al. .............. 428/633 |
| 4,269,032 A | 5/1981 | Meginnis et al. |
| 4,296,606 A | 10/1981 | Reider |
| 4,318,666 A | 3/1982 | Pask |
| 4,392,656 A | 7/1983 | Tirole et al. |
| 4,419,044 A * | 12/1983 | Barry et al. ................ 415/117 |
| 4,497,610 A * | 2/1985 | Richardson et al. ........ 415/116 |
| 4,526,226 A * | 7/1985 | Hsia et al. .................. 415/116 |
| 4,573,865 A | 3/1986 | Hsia et al. |
| 4,629,397 A | 12/1986 | Schweitzer |
| 5,080,557 A | 1/1992 | Berger |
| 5,605,046 A | 2/1997 | Liang |
| 5,823,741 A | 10/1998 | Predmore et al. |
| 6,397,765 B1 * | 6/2002 | Becker ......................... 60/752 |

FOREIGN PATENT DOCUMENTS

| | | |
|---|---|---|
| DE | 197 27 407 A1 | 1/1999 |
| EP | 0 694 677 A1 | 1/1996 |
| EP | 1 022 437 A1 | 7/2000 |
| GB | 2 117 831 A | 10/1983 |
| GB | 2 257 754 A | 1/1993 |
| WO | WO 98/13645 | 4/1998 |
| WO | WO 99/47874 | 9/1999 |
| WO | WO 00/60219 | 10/2000 |

* cited by examiner

Primary Examiner—Richard A. Edgar

(57) ABSTRACT

A coolable segment for a turbomachine such as a combustion turbine, which turbomachine is operated with a hot fluid. The segment comprises a cooling wall extending in an axial direction and in a circumferential direction orthogonal to the axial direction; a hot fluid surface to be exposed to the hot fluid. Between the wall and the surface a cooling structure is arranged which is permeable to cooling fluid and provides cooling surfaces for cooling by heat transmission through radiation. The cooling structure comprises either a netting, in particular a wire netting or a porous material.

13 Claims, 5 Drawing Sheets

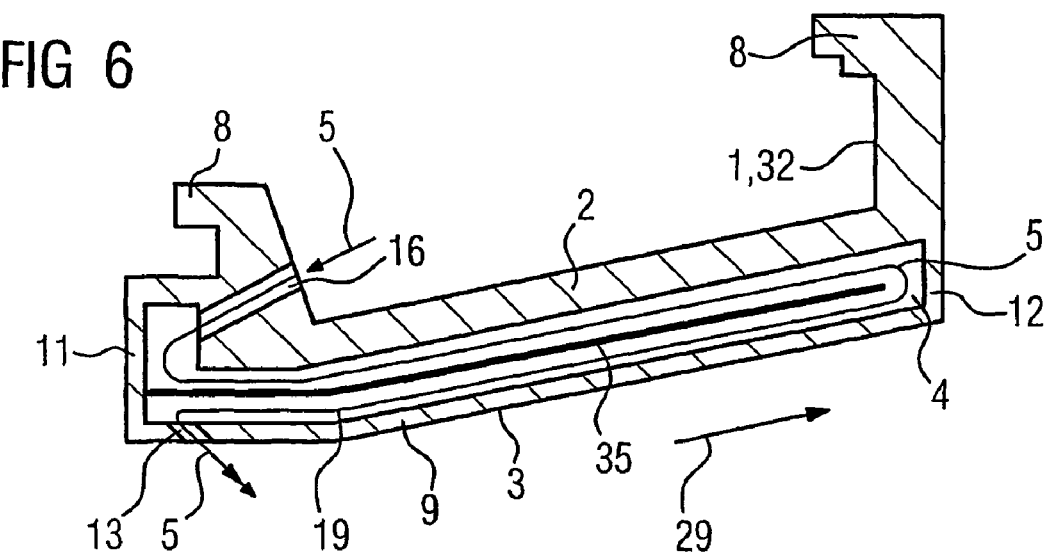
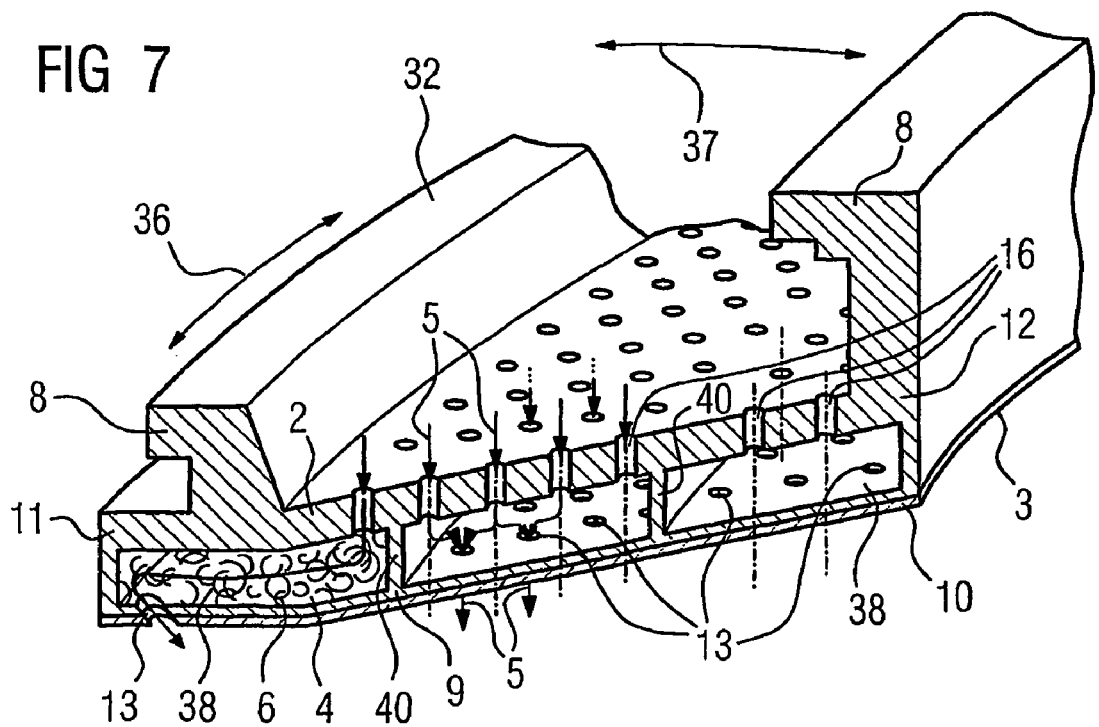

COOLABLE SEGMENT FOR A TURBOMACHINE AND COMBUSTION TURBINE

CROSS REFERENCE TO RELATED APPLICATIONS

This application is a continuation of International Application No. PCT/EP02/07029, filed Jun. 25, 2002 and claims the benefit thereof. The International Application claims the benefits of British application No. 0117110.7 filed Jul. 13, 2001, both of the applications are incorporated by reference herein in their entirety.

BACKGROUND OF THE INVENTION

Field of the Invention

The invention relates to a coolable segment of a turbomachinery, in particular a shroud or guide blade plate (guide ring segment) of a combustion turbine. The invention also relates to a combustion turbine having a coolable segment.

An important consideration in the design of a turbomachine, in particular gas turbine engines or steam turbines, is to ensure that various components of the engine are maintained at safe operating temperatures. This is particularly true for elements of a gas turbine like a combustor and a turbine section, which are exposed to the highest operating temperatures in the engine, and which include turbine nozzles or vanes, turbine buckets or rotating blades and shrouds. A turbine nozzle directs hot gas within an annular gas path, to cause the adjacent following bucket row to rotate, producing power. A shroud defines a portion of the gas path radially outward of the rotating bucket row.

In the turbine section of gas turbine engines, high thermal efficiency is dependent upon high turbine entry temperatures. These entry temperatures, in turn, are limited by the heat which the materials forming the turbine nozzles, buckets and shrouds can safely withstand. In cases in which the gas path temperatures are above the material limitations, the gas path surfaces of these components must be cooled to survive. Thus, in addition to improvements in the types of materials and coatings used to fabricate these components, continuous air cooling has been employed to permit the environmental operating temperature of the turbine to exceed the melting point of the materials forming the components without affecting their integrity.

A number of fluid cooling techniques, in particular air cooling techniques, have been used in an attempt to effectively and uniformly cool the components of the turbine section, the combustor and other portions of gas turbine engines.

In European Patent Application EP 1022437A1 to Tiemann at al. an element of a combustion turbine is disclosed which comprises a wall element having an internal coolable area. Between two of those wall elements a gap for allowing compensation of thermal expansion is sealed off by a seal element. The internal coolable area is supplied with cooling air which exits the wall element through a bore opening into the gap whereby the cooling air exiting the bore cools by impingement cooling the wall of the adjacent wall element. After exiting the gap the cooling air flows along an outer surface of the wall element thereby shielding the outer surface from a stream of hot gas flowing in the combustion turbine.

In International publication WO 00/60219A1 to Tiemann et al a turbine-engine with an array of wall elements that can be cooled and method of cooling an array of wall elements is described. This method includes the step of cooling a first element, in particular a portion of a turbine vane by impingement cooling and a further step which includes the using the same cooling fluid for cooling a second component downstream of the first component. For reducing a cooling fluid lost by leakage a cooling passage is formed between the first and the second component for which the cooling fluid flows after cooling the first component. The second component, which is preferably a shroud, is cooled by a cooling fluid in a convection-cooling manner.

Published German patent application DE 19727407 A1 to Krebs refers to a heat shield plate for a combustor of a gas turbine. On the internal wall of the combustor the plates are mounted forming a cavity with the combustors wall. In the wall of the combustor cooling fluid channels directed perpendicular to the walls surface and having openings formed as nozzle into the cavity. These nozzles serve to improve the impingement cooling by a cooling fluid being directed to the plate. The plate itself has a number of diffusion cooling channels leading from the cavity to the outer surface of the plate and being inclined by an angle of about 30 degrees with respect to the outer surface of the plate.

In WO 98/13645 A1 to Gross et al. a closed loop air cooled heat shield component is disclosed. This heat-shield component comprises a cooling-fluid return, a hot-gas wall to be cooled, an inlet duct for conducting a cooling fluid and an outlet duct for returning the cooling fluid. The inlet duct is directed towards the hot-gas wall and widens in a direction of the hot-gas wall.

In WO 99/47874 A1 to Becker at al. a wall segment for a combustion chamber is described which is exposed to a hot combustion gas. The wall segment has a metal support structure and a heat protection element secured thereon. The metal support structure is provided, at least partially covered with a thin heat resistant separating layer. The separating layer is arranged between the metal support structure and the heat protection element. The heat protection element is in addition cooled by cooling gas.

U.S. Pat. No. 5,823,741 to Predmore at al. describes a gas turbine plant, in which components of a nozzle structure are sealed through a seal joint including a sealing member for sealing segmented components of a gas turbine engine. The seal joint is spaced from the gas path to provide more effective cooling. The segments include radial extension flanges spacing the seal joint from the gas path. For the cooling of the segmented components cooling arrangements are shown to provide for open or closed circuit impingement or convection cooling plus film cooling.

SUMMARY OF THE INVENTION

It is an object of the invention to provide a coolable segment for a turbomachine to be exposed to a hot fluid with enhanced cooling features. It is a further object of the invention to provide a combustion turbine with an enhanced cooling of segments being exposed to a hot fluid which operates the combustion turbine.

With the forgoing and other objects in view there is provided in accordance with the invention, a coolable segment for a turbomachine, which turbomachine is operated with a hot fluid. The segment comprises a cooling wall extending in an axial direction and in a circumferential direction orthogonal to said axial direction and a hot fluid surface to be exposed to said hot fluid. Between said cooling wall and said hot fluid surface a cooling structure permeable to cooling fluid and providing cooling surfaces for cooling by heat transmission through radiation is foreseen.

The invention takes into consideration the perception that in a turbomachine having segments being exposed to high temperatures, those segments have wall structures with a wall thickness higher than the preferred thickness for cooling purposes to assure the requirements on mechanical strength of the segments. This takes into account that for a given internal/external heat transmission coefficient and a temperature of the hot fluid the temperature of the material, in particular of the cooling wall increases with increasing thickness of the wall. This leads on the one hand to the effect that either the segment has to withstand a higher temperature, which would lead to a reduction in mechanical strength or lifetime. On the other hand it would be necessary to provide more cooling fluid for adjusting the material temperature under a given threshold. Using more cooling fluid, in particular cooling air, would lead to a reduced overall efficiency of the combustion turbine as the cooling air is normally separated from the air, which is fed to the combustor. Therefore using more cooling air should be avoided.

The invention overcomes this problem by introducing a cooling structure, which allows an additional cooling process based on heat transmission by radiation to contribute to the overall cooling process including cooling by convection. In a segment having a hot fluid surface being exposed to a hot fluid and inner surfaces in a cooling structure at a lower temperature heat radiation is emitted from one surface to other surfaces arranged in the neighbourhood. As long as opposing surfaces have almost the same temperature no temperature change in the segment occurs by emitting and receiving heat radiation. Introducing a cooling structure in which neighbouring surfaces are kept on a lower temperature an additional heat transfer from the hot fluid surface being exposed to the hot fluid into the segment directed towards the cooling wall can be obtained. The amount of heat which can be transferred is proportional to the difference of temperatures to the power four $(T_{Wall}^4 - T_{surfaces}^4)$. This implicates that the amount of heat which can be transferred through radiation not only depends on the temperature difference between neighbouring surfaces but also on the actual temperature of the surfaces itself. So the cooling process by heat radiation can significantly increase the overall cooling efficiency by adding to the other cooling processes like impingement cooling and/or convective cooling. The cooling structure provides "cold" cooling surfaces in the neighbourhood of the hot fluid surface to be exposed to the hot fluid for using the high potential of the cooling by heat radiation.

In accordance with another feature the cooling structure comprises a netting, in particular a wire netting. The netting increases the internal heat transmission. The netting may fill a cavity or a chamber to which the cooling fluid is fed so that in addition to the cooling of the inner surface of the cooling wall a cooling by heat radiation throughout the whole cooling channel or chamber can be obtained. The cooling structure in form of the netting provides a number of additional cooling surfaces, namely the surfaces of the wires or fibres, which receive and emit heat radiation from or to other surfaces. So the cooling surfaces in the vicinity of the hot fluid surface receive heat by radiation and retransmit the heat to other colder cooling surfaces of the netting. So by successive heat transmission by radiation from wire to wire a flow of heat throughout the netting is directed away from the hot fluid surface to the cooling wall. This intensive cooling of the hit fluid surface by virtue of the cooling surfaces of the netting leads to an enlarged temperature difference between the hot fluid surface and the cooling wall. The cooling fluid further contributes to the cooling process by flowing though the permeable netting and absorbing heat when passing along the wires.

In accordance with a further feature the cooling structure comprises a porous material. The porous material also provides many cooling surfaces capable to receive and transmit heat via radiation and so leading to a flow of heat from the hot fluid surface to the cooling wall. Due to the porosity cooling fluid can flow through the porous material and so also provides a convective cooling. The amount of porosity is adjusted to the cooling fluid used, in particular cooling air, the expected temperature of the hot fluid surface and the cooling wall temperature as well as on the flow velocity of the cooling fluid and the amount of cooling fluid which passes through the porous material per time and others relevant parameters.

In accordance with an added feature the porous material of the cooling structure is manufactured by casting and leaving holes for forming the porosity in the cast material. Those holes forming the porosity can be obtained by using different methods, in particular by using distinct small kernels which after the casting of the cooling structure are removed, so that the cast cooling structure is permeable for cooling fluid. The porous cooling structure may be in mechanical contact either with the cooling wall and/or the hot fluid surface, which itself can be part of a hot fluid wall. This leads to a thermal connection between the cooling wall and the porous structure and/or the hot fluid surface and the cooling structure so that a direct thermal connection between the wall and hot fluid surface can be obtained which leads to an improved convective cooling. The cooling structure itself by being connected to the hot fluid surface functions as fins or ribs which also improves the convective cooling.

The permeability for cooling fluid of the netting and the porosity of the porous material may be adjusted in advance according to the expected temperature and other constraints within the turbomachine. By choosing a cooling structure for a preferred operation condition of the turbomachine it has to be considered that with decreasing mass density, e.g. increasing porosity, the cooling by heat radiation decreases too, as there are less cooling surfaces available for receiving and emitting heat radiation. On the other hand with increasing mass density the pressure loss of the cooling fluid flowing through the cooling structure increases so that the amount of cooling fluid, in particular cooling air, flowing through the cooling structure is reduced. In this case a gain on improvement of cooling efficiency is reduced due to a greater demand for cooling fluid to flow through the cooling structure. Within these two extremes there is a range which allows an efficient extra cooling due to heat radiation depending on the temperature within the turbomachine. On a theoretical basis the highest cooling efficiency due to heat radiation is achieved with a cooling structure having such a porosity/permeability that the heat emitted by the hotter surface is exactly absorbed by the colder surface. Preferably the heat emitting area (surfaces) per volume unit of the cooling structure is made as large as possible. This can be expressed in terms of the coefficient $k_t$ of extinction for absorbing radiation divided by the product of heat transmitting area per volume ($A_v$) and heat transmission coefficient ($\alpha$) is as little as possible ($k_t/(\alpha \cdot A_v$ is small).

In accordance with an additional feature the hot fluid surface is formed by a hot fluid wall. Preferably between this hot fluid wall and the cooling wall a cavity, a channel or in general a space is formed which is at least partially filled with a cooling structure. Furthermore it is possible that, when using a porous material for the cooling structure the hot fluid surface itself may form a portion of the porous material being exposed to the hot fluid. The space formed between hot fluid wall and the cooling wall can be filled in different ways and to different degrees with a cooling structure. Furthermore two or more distinct cooling structures can be arranged, in particular with distinct permeability for cooling fluid or with distinct porosity. It is further possible that between the hot fluid wall and the cooling wall through channel sidewalls or chamber sidewalls a number of distinct chambers or channels can be formed which may be filled with different cooling structures or even some of the chambers or channels do not even need to have a cooling structure. So a variety of possibilities for adjusting the cooling capacity and efficiency of the coolable segment can be obtained.

In accordance with yet another feature the hot fluid wall is covered with a protective layer, in particular a thermal barrier layer and/or a corrosion protective layer. Applying a protective layer on the hot fluid wall may reduce the necessity and the amount of cooling for the segment as well as increase the lifetime of the segment. A corrosion or erosion protective layer furthermore protects the hot fluid wall of being mechanically or chemically destroyed or of being altered in its material composition due to corrosion or other chemical effects. This also leads to an improved lifetime of the coolable segment. Applying protective layers to the components of a combustion turbine is well known for those persons skilled and active in the art. Thermal barrier layers may be preferably made of ceramic materials like zirconia partially stabilised with yttria, alumina, or the like. Corrosion and erosion protective layers may be made of materials widely known as MCrAlY layers, aluminides or others. The protective layer may also comprise two or three different layers. Also an adhesion or bonding layer may be provided for bonding a ceramic layer to the hot fluid wall.

In accordance with yet a further feature, the cooling structure comprises a heat conducting material, in particular a metal or a heat conducting ceramic. A preferable heat conducting ceramic may be a silicon carbide (SiC). Silicon Carbide has good heat conductivity and also the ability to withstand high temperature conditions. As suitable metals all those metals can be used which withstand temperatures occurring in the turbomachinery. Preferably for providing a cooling structure comprising a netting such metals are used which are easy to manufacture as wires or fibres. For providing a cooling structure with a porous cast material preferably those metals are chosen which are easy to cast.

In accordance with yet an added feature the cooling structure is connected to the cooling wall to allow heat transfer from the cooling structure into the cooling wall. The cooling structure, in particular a netting is welded or braised to the cooling wall. A cooling structure comprising a cast porous material is preferably cast together with the cooling wall in one manufacturing step. A netting braised to the cooling wall serves as an additional cooling fin or cooling rib and so not only contributes to a cooling by heat radiation but also to a convective cooling. Unlike a usual cooling fin the netting builds up a new boundary layer which shows a high heat transmission. Furthermore compared to a usual cooling fin the heat transmission may be obtained throughout the whole space between the hot fluid surface and the cooling wall.

In accordance with yet an additional feature at least two cooling channels are formed between the cooling wall and the hot fluid surface, allowing cooling fluid to flow along the axial direction wherein at least one cooling channel comprises the cooling structure. The at least two cooling channels, which are axial or longitudinal cooling channels providing a flow of cooling fluid in the same direction as the hot fluid expanding in the turbomachinery can be obtained by introducing longitudinal sidewalls in the space between the hot fluid surface and the cooling wall. These axial channels are simple and inexpensive to manufacture. Using those cooling channels leads to an effective additional cooling by radiation in particular for temperatures, up to which the cooling fluid can absorb sufficient heat by convective cooling also at the end of the cooling channel.

In accordance with a concomitant feature the cooling segment comprises at least two cooling chambers formed between the cooling wall and the hot fluid surface, allowing cooling fluid to flow from the cooling wall to the hot fluid surface, i.e. almost perpendicular to the cooling wall. The cooling chamber maybe formed as a cooling channel extending in the circumferential direction or having a more or less square cross-section. The cooling fluid in the cooling chamber is more or less directly directed from the cooling wall to the hot fluid surface and not along the axial direction which means that it flows from the cooling wall to the hot fluid surface. So the distance the cooling fluid travels from the cooling wall to the hot fluid surface is sufficient short so that the cooling fluid has a low temperature and can absorb heat whilst travelling to the hot fluid surface for all relevant temperatures achieved within a turbomachinery. These temperatures can be up to 1300° C. or even more. Having two or more cooling chambers it is possible to supply cooling fluid with a low temperature all over the segment to the cooling chambers. So a high cooling efficiency is obtained with a small amount of cooling fluid needed. Furthermore the problem of heating up the cooling fluid is avoided, which may occur when the cooling fluid travels a long distance in the axial direction. So in case of particular high temperatures a flow of the cooling fluid perpendicular to the cooling wall instead of axial direction can be more appropriate.

Providing a cooling chamber with an almost square cross-section leads to a space between the cooling wall and the hot fluid surface, which is almost a cube formed by sidewalls in the circumferential direction and the axial direction. The temperature in the cooling structure increases from the cooling wall to the hot gas surface, wherein the increase is almost continuous. Furthermore the temperature of the cooling fluid travelling from the cooling wall to the hot fluid surface increases, in particular also continuously. So between the cooling structure and the cooling fluid in any location between the cooling wall and the hot gas surface a temperature difference exists which is almost constant. This leads to a high amount of convective cooling throughout the cooling structure. Having a number of cooling chambers for a perpendicular flow of the cooling fluid and/or cooling channels for axial flow of the cooling fluid the cooling efficiency can be adjusted to the operating conditions of the turbine machinery by choosing a cooling structure having a certain permeability for cooling fluid or porosity. Furthermore the amount of cooling fluid to flow per second through the channels or chambers can be locally adjusted to the local heat conditions of the channels or chambers and the hot fluid surface. By using cooling chambers with perpendicular flow of the cooling fluid parameters like porosity or amount of cooling fluid can be chosen within wide range without being restricted to the thermal conditions existing at the most endangered portion of the segment.

In according with again another feature the coolable segment comprises a cooling fluid supply passage through the cooling wall for cooling fluid to enter the cooling structure. The cooling fluid supply passage maybe a bore in the cooling wall. According to the geometry of the space between the cooling wall and the hot fluid surface, in particular formed as an axial cooling channel, a circumferential cooling channels or cube like cooling chamber number and location of the fluid supply passages can be chosen.

In accordance with again a further feature the cooling fluid supply passage acts as a throttle performing a higher pressure loss than within the cooling structure. As the pressure loss of the cooling fluid in the cooling structure increases with higher temperatures of the cooling fluid due to the absorption of heat from the cooling structure, this may lead to a situation that in the hotter portions of the cooling structure through which cooling fluid needs to flow for cooling purposes less cooling fluid flows than through those portions which are colder. This situation can be avoided by shifting the smallest fluid cross section to the entrance of the cooling structure so that the pressure loss which dominates the throughflow of the cooling fluid lies at a location with constant cooling temperature. So within the cooling structure a blocking of cooling passages can be avoided and an almost homogeneous distribution of cooling fluid throughout the cooling structure regardless of hotter or colder portions can be obtained. Furthermore a throttle in a fluid supply passage allows an adjustment of the amount of cooling fluid passing through the cooling structure to the pressure imposed by the hot fluid on the hot fluid surface. This is for example of interest in a combustion turbine wherein the coolable segment is a guide ring, as due to the relative short length of the guide ring relatively high differences in the amount of pressure imposed by the hot fluid exist over the guide ring.

In accordance with again an added feature cooling fluid supply passages are distributed along the axial direction. In case of cooling channels allowing cooling fluid to flow in the axial direction fresh cooling fluid with a low temperature can be introduced in the cooling channel via the cooling fluid supply passages so that the cooling fluid has enough capacity to absorb heat either by convective heat transition or by heat radiation within all locations of the axial channel. In case of a number of circumferential cooling channels or cube like cooling chambers arranged along the axial direction to each of these cooling channels or cooling chambers cooling fluid can be supplied through at least one supply passage.

In accordance with again an additional feature the hot fluid surface comprises at least one aperture along the axial direction for cooling fluid to exit the cooling structure. In the case of cooling channels extending along the axial direction the apertures or the at least one aperture is located in the area of a downstream end of the cooling channel. So cooling fluid may flow from an upstream end of the cooling channel towards the downstream end whilst cooling the coolable segment, in particular the hot fluid surface all along this way. In case of cooling chambers, in particular cooling channels extending in a circumferential direction or cube like cooling chambers, at least one aperture, preferably more than two apertures are located in the circumferential direction or the cross section of the cooling chamber. With a number of cooling chambers arranged in the axial direction also a number of apertures are assigned to different cooling chambers and distributed along the axial direction, which allows cooling fluid to exit all over the hot fluid surface. This leads to an improved film cooling of the hot fluid surface and gives the opportunity to arrange cooling chambers in different patterns between the hot fluid surface and the wall for achieving a high cooling efficiency.

Those chambers in particular formed between side walls directed in the circumferential direction and side walls extending in the axial direction, give the opportunity to provide cooling fluid through a number of cooling fluid supply passages. A cooling fluid supply passage is in particular a supply bore in the cooling wall. Furthermore a number of cooling fluid exits may be arranged in the hot fluid surface for cooling fluid to exit the cooling structure. So a predefined perpendicular flow of cooling fluid leads to an improved cooling efficiency. Arranging chambers with circumferential and axial sidewalls also increases the surface area for heat transmission via radiation and so further improves the cooling efficiency.

Instead of having a number of exits in the hot fluid surface, which may be made by a number of bores or holes in a hot fluid wall the hot fluid surface itself could be the surface of the porous material of the cooling structure or the surface of a netting exposed to the hot fluid. In this case the hot fluid surface is provided by the cooling structure itself. So the cooling fluid does not leave the cooling structure through a limited number of discrete exits, in particular bores but through a plurality of openings or spaces within the cooling structure itself which all have different size, different opening angles etc. This further reduces the formation of hot spots along the hot fluid surface and allows by performing the effusion cooling a very high cooling efficiency with very little consumption of cooling fluid. Due to the cooling structure with a permeability and porosity which can be chosen in a wide range it is also possible for each of the cooling chambers, which may form more a less a cube, to adjust the amount of cooling fluid to flow through the chamber with respect to the local pressure of the hot fluid acting on the hot fluid surface.

It is also possible to arrange circumferentially extending side walls and axial extending side walls so that cooling chambers allowing a flow of cooling fluid perpendicular to the cooling wall arranged in the neighbourhood of cooling channels allowing cooling fluid to flow in the axial direction between the wall and the hot fluid surface. For those cooling chambers allowing axial flow of cooling fluid two or more cooling supply openings in the wall can be arranged in the axial direction for introducing new cooling fluid downstream the first supply opening so as to ensure that the temperature of the cooling fluid in the cooling chamber is always sufficient low. The locations, distribution and number of cooling chambers and cooling channels can be determined in advance by those skilled and active in the technical field according to the operating conditions of the turbine machinery and the cooling effect which has to be obtained In accordance with still another feature the coolable segment comprises a partition for guiding the flow of cooling fluid in one direction and back in the opposite direction for increasing the travel period of the cooling fluid before exiting the segment. Preferably the partition extends in the axial direction. The partition separates the space between the cooling wall and the hot fluid surface in two spaces one defined between the cooling wall and the partition and the other defined between the partition and the hot fluid surface. In this case the cooling fluid may travel in the first portion in the axial direction downstream and then in the second portion back upstream. It is also possible to have more than one partition dividing the space between cooling wall and hot fluid surface in more than two portions so that the cooling fluid is slowly heated up. This even leads to higher thermal separation between the colder cooling wall and the hotter hot fluid surface. This can be under certain conditions desirable.

In accordance with still an added feature the cool able segment is an element of a combustion turbine, in particular a heat shield element for a combustion chamber, a shroud portion of a turbine vane or a guide ring segment for forming a wall portion opposing rotating turbine blades. Those parts of the combustion turbine are exposed to high temperatures for example to up to and over the 1300° C. and therefore the cooling structure as described above assures an efficient cooling of these components and temperature is well kept under critical temperatures of the materials used for these components.

In accordance with still an additional feature the coolable segment is arranged in a combustion turbine, in particular a turbine for a jet engine or in a stationary gas turbine, which stationary gas turbine may serve for the generation of electrical power. The coolable segment may also be arranged in a combustion turbine used for submarines and earthbound vehicles, like cars or trucks.

In accordance with another object of the invention it is provided a combustion turbine comprising a hot gas chamber having a hot gas flow region. The turbine further comprises a wall structure surrounding the hot gas flow region and having a coolable segment with a cooling wall extending in an axial direction and in a circumferential direction orthogonal to the axial direction. The coolable segment further has a hot fluid surface to be exposed to the hot gas, wherein between the cooling wall and the hot fluid surface a cooling structure providing cooling surfaces for cooling by heat transmission through radiation is arranged, which cooling structure is permeable to cooling fluid. For the cooling structure as well as for the cooling process for cooling the combustion turbine the same advantages hold as described above. Preferably the cooling segment further comprises at least one cooling fluid supply passage through the cooling wall for cooling fluid to enter the cooling structure, wherein the cooling fluid supply passages are arranged in the axial direction. Furthermore apertures or openings in the hot fluid surface for cooling fluid to exit the cooling structure along the axial direction are foreseen.

Although the invention is illustrated and described herein as embodied in a coolable segment and in a combustion turbine, it is nevertheless not intended to be limited to the details shown, since various modifications and structural changes may be made therein without departing from the spirit of the invention and within the scope and range of protection of the claims.

The construction of the coolable segment and the combustion turbine of the invention, however, together with additional objects and advantages thereof will be best understood from the following description of specific embodiments when read in conjunction with the accompanying drawings.

BRIEF DESCRIPTION OF THE DRAWINGS

FIG. 6 is a fragmentary, cross-sectional view of a further example of a guide ring in a combustion turbine;

FIG. 7 is a fragmentary perspective view of an additional example of a guide ring of a combustion turbine;

DESCRIPTION OF THE PREFERRED EMBODIMENTS

Figure 1:
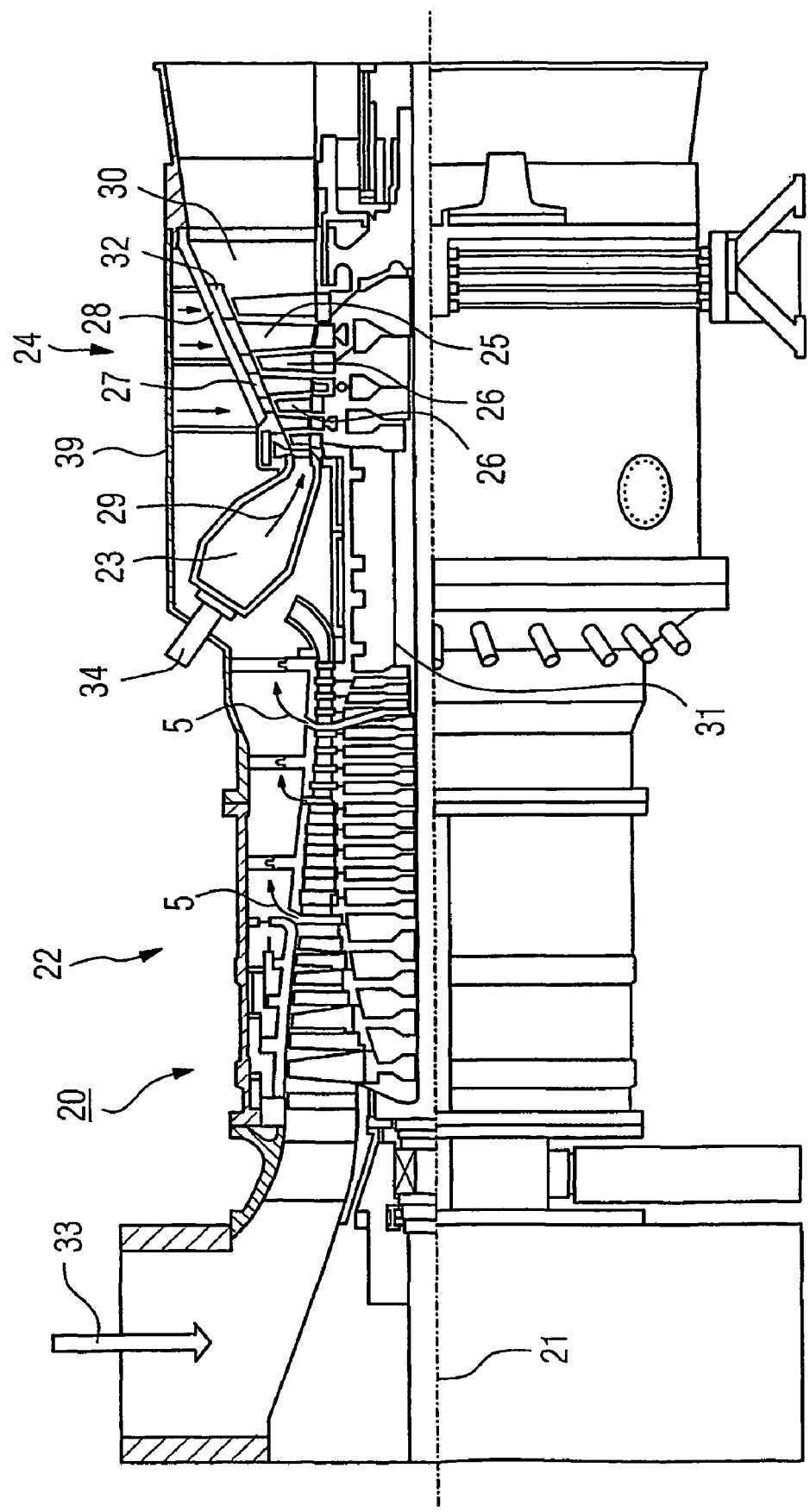
FIG. 1 is a fragmentary, diagrammatic, longitudinal, sectional view of a combustion turbine.

In the drawing throughout the figures like reference numerals have the same meaning.

Referring now to the figures of the drawings in detail and first, in particular, to FIG. 1 thereof, there is shown in a cross-sectional view a stationary combustion turbine 20 as a turbomachinery extending along a main axis 21. The combustion turbine 20 comprises a compressor 22 for compressing air 33 which serves for the combustion process, a annular combustion chamber 23 having a number of burners 34 for a liquid or gaseous fuel and a turbine section 24, which turbine section 24 drives the compressor 22 and a not shown generator for generating electrical power. The combustion turbine 20 further comprises a turbine rotor 31 on which in the turbine section 24 four rows of rotating blades 26 being spaced apart along the main axis 21. The turbine section 24 further comprises an inner turbine housing 28 to which four rows of guide blades 25 (vanes) are attached in a circumferential direction. The first row of guide blades 25 is located upstream of the first row of rotating blades 26 and between the remaining rows of rotating blades 26 one row of guide blades 25 is arranged. A pair of adjacent rows of guide blades 25 and rotating blades 26 is called as turbine stage. Each of the guide blades 25 has a shroud 27, which is attached to the inner turbine housing 28. Opposite to each row of rotating blades 26 guide rings 32 are arranged in a circumferential direction and attached to the inner turbine housing 28. The guide rings 32 and the shrouds 27 attached to the inner turbine housing 28 form a hot gas channel 30 of the turbine section 24.

During the operation of the combustion turbine 20 atmospheric air 33 is fed to the compressor 22 and compressed therein. A small portion of this compressed air 33 (<5%) is branched of out of the compressor 22 and serves as cooling fluid, e.g. cooling air 5. The remaining major portion of the compressed air 33 is fed to the combustion chamber 23. In the combustion chamber 23 through the burner 34 a not shown fuel is burned with the compressed air 33 to a high-pressure hot fluid 29 (hot gas). This hot gas 29 flows through the hot gas channel 30 thereby passing through the rows of guide blades 25, which serves as nozzles to direct the flow of hot gas 29 in a predefined way to the rotating blades 26 thereby forcing the rotating plates 26 to rotate. The hot gas 29 also flows along the shroud 27 and guide rings 32 arranged in the turbine section 24. So each shroud 27 and each guide ring 32 are elements of the turbomachinery 20 which are exposed to a high thermal load, in particular are exposed to temperatures up to over 1200° C. As will be explained in more detail with respect to FIG. 2, a guide ring 32 is a coolable segment 1 which has a hot fluid surface 3 being exposed to the hot gas 29. The guide ring 32 as coolable segment 1 is cooled by cooling fluid 5 which is air branched of from the flow of air 33 passing through the compressor 22. The combustion chamber 23 and the turbine section 24 including the hot gas channel 30 each represent a hot-gas flow region. Each hot-gas flow region is surrounded by a respective wall structure, e.g. the inner turbine housing or the combustion chamber wall 39.

Figure 2:
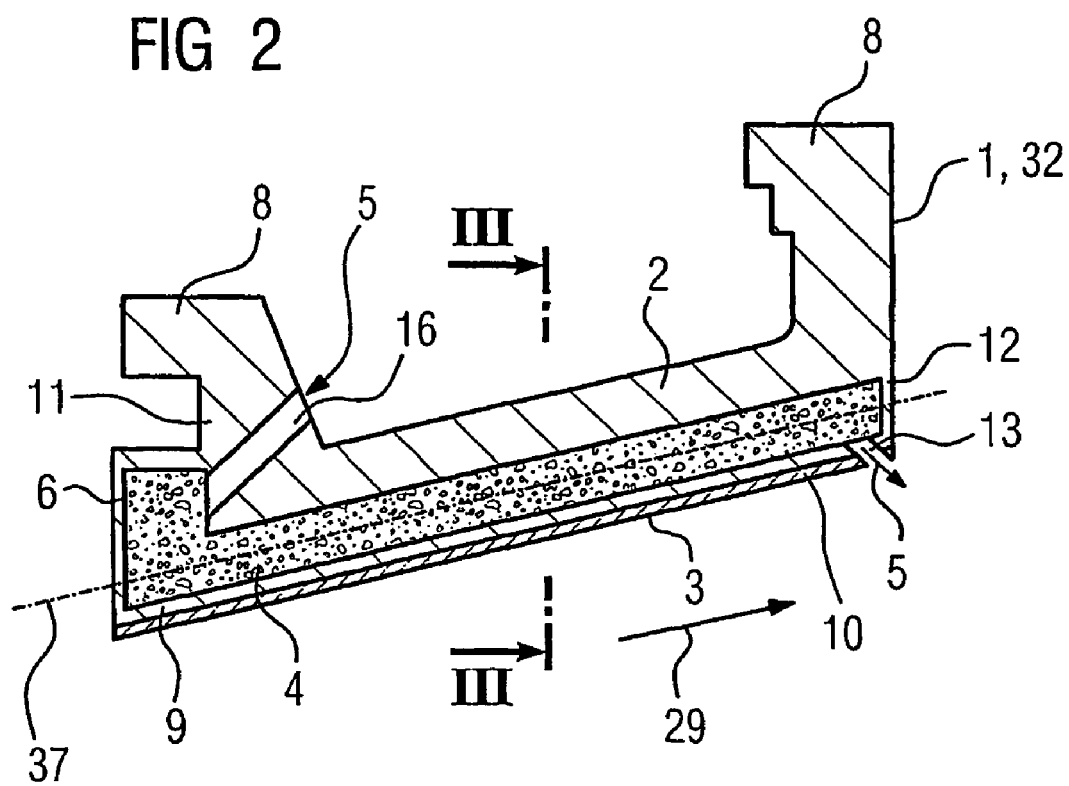
FIG. 2 is an enlarged fragmentary, cross-sectional view of a guide ring along the main axis of a combustion turbine.

FIG. 2 shows an enlarged cross sectional view of a guide ring 32 as coolable segment 1 along the main axis 21 of the combustion turbine 20. The guide ring 32 has a wall-structure 7 with hook like end portions 8 for attaching the guide ring 32 to the inner turbine housing 28. It further comprises a cooling wall 2 which gives the guide ring 32 a mechanical stability and serves for conducting heat away from the hot gas channel 30. The guide ring 32 further comprises a hot fluid surface 3 which is exposed to the hot gas 29. The hot fluid surface 3 is the surface of a structure made of a hot fluid wall 9 which is covered by a protective layer 10. The protective layer 10 itself may consist of two or more layers one of which being exposed to the hot gas 29 is a thermal barrier layer, in particular made of a ceramic material like zirconia partial stabilised with yttria. One of the other layers can be an anchoring or an adhesion layer which serves for binding the ceramic layer to the hot fluid wall 9 and which is preferably made of the suitable heat resistant metal. Between the hot fluid surface 3 and the cooling wall 2 a porous cooling structure 4 is arranged having cooling surfaces 6 for emitting and receiving heat radiation. These porous cooling structures 4 may be casted together with the wall structure 7 of the coolable segment 1. Due to the porosity of the cooling structure 4 cooling fluid 5, in particular air, can flow from a upstream end region 11 of the cooling structure 4 mainly in an axial direction 37 to a downstream end region 12 of the cooling structure 4. In the upstream end region 111 of the wall structure 7, in particular in the cooling wall 2 at least one fluid supply passage 16, in particular a bore, allows cooling fluid 5 to enter the cooling structure 4. At the down stream end region 12 at least one aperture 13 in the hot fluid wall 9, i.e. in the hot fluid surface 3, allows cooling fluid 5 to exit the cooling structure 4 and to flow into the hot gas channel 30 thereby mixing with the hot gas 29. The aperture 13 is preferably inclined to the hot fluid wall 9 by a small angle to achieve a film cooling when the cooling fluid 5 exits the cooling structure 4.

The porous cooling structure 4 may be casted together with the wall structure 7 using the same heat conducting material, in particular a metal, for example heat resisting steel. It may also be manufactured in a different way and using a different material like a heat conducting ceramic like Silicon carbide. The cooling structure 4 is directly connected to the cooling wall 2 as well as to the hot fluid wall 9 so that by means of heat conduction the hot fluid surface 3 is cooled. Furthermore, due to the pores within the cooling structure 4 which form the cooling surfaces 6 between which heat can be transmitted from a hotter surface via heat radiation to a colder surface the transfer of heat is directed from the hot fluid surface 3 to the cooling wall 2. So the porous cooling structure 4 provides two cooling processes for cooling the hot fluid surface 3 namely: connective cooling and cooling by heat transmission through radiation from a hotter surface to a colder surface within the porous cooling structure 4. The porous cooling structure 4 itself may serve to improve the mechanical stability of the coolable segment 1, e.g. each guide ring 32, so that the hot fluid wall 9 may be much thinner than the cooling wall 2.

Figure 3:
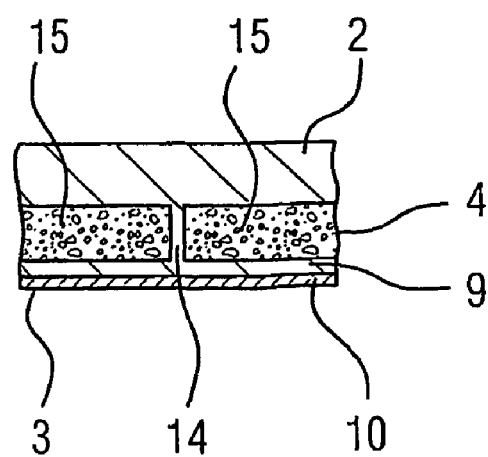
FIG. 3 shows a fragmentary view of the guide ring according to FIG. 2 along line III-III.

For improving the mechanical stability of the guide ring 32 axial side walls 14 extending in the direction of the main axis 21 are arranged between the hot fluid wall 9 and the cooling wall 2 (see FIG. 3). Those sidewalls 14 may extend over the whole length of the guide ring 32 in the direction of the main axis 21 thereby providing at least two cooling channels 15 through which cooling fluid 5 flows in the axial direction 37 from the upstream end region 11 to the downstream end region 12 in the cooling structure 4.

Figure 4:
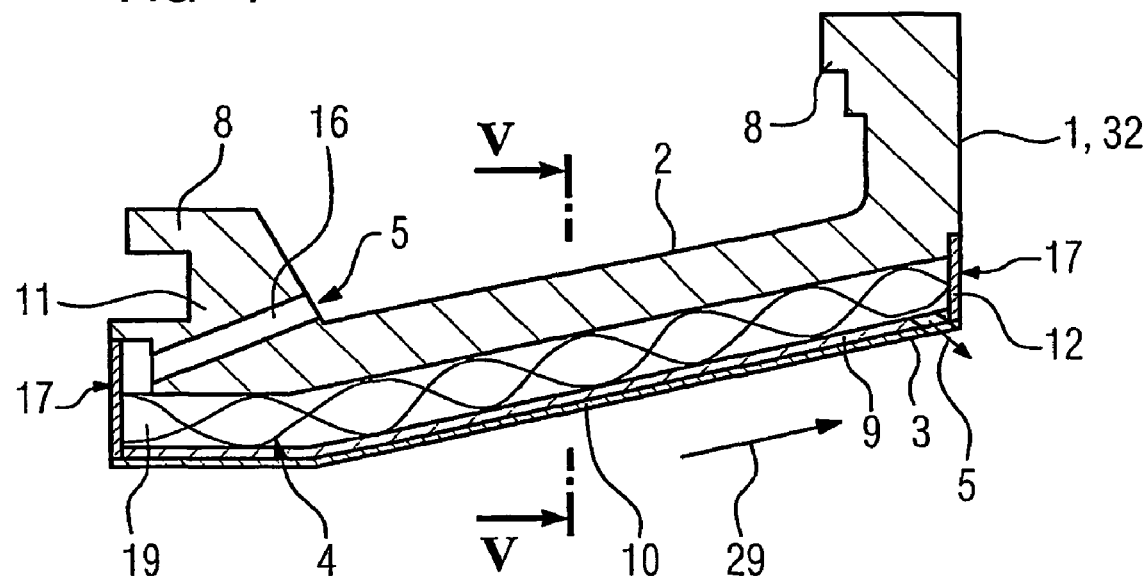
FIG. 4 is an enlarged, fragmentary, cross-sectional view of a another example of a guide ring along a main axis of a combustion turbine.
Figure 5:
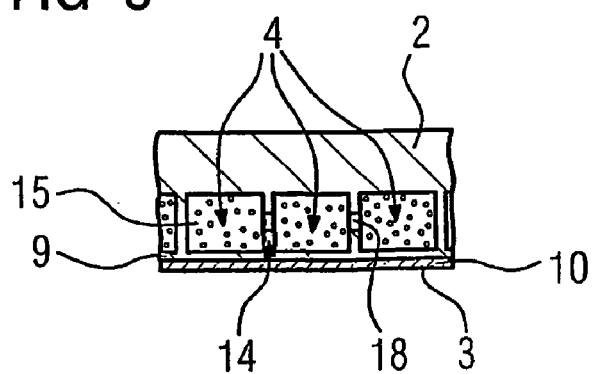
FIG. 5 is a fragmentary cross-sectional view along line V-V of the guide ring of FIG. 4.

FIG. 4 shows an enlarged cross section of view of another embodiment of a coolable segment 1 in form of a guide ring 32. The guide ring 32 according to FIG. 4 has many features quite similar to the guide ring 32 described above with respect to FIG. 2. It is therefore referred to this portion of the description for these features. The guide ring 32 shown in FIG. 4 differs from that guide ring 32 of FIG. 2 in particular with respect to the cooling structure 4 between the hot fluid wall 9 and the cooling wall 2. A space 19 is formed in which the cooling fluid 5 flows from the up stream end region 11 to the down stream end region 12. This space 19 is filled with a cooling structure 4 which is a wire netting consisting of metallic fibres. The space 19 is closed by access covers 17 at the upstream end region 11 as well as at the downstream end region 12. The access covers 17 can be removed during maintenance of the combustion turbine 20 giving the possibility to replace the cooling structure 4, in particular the wire netting by a new one during repair or maintenance of the combustion turbine 20. The space 19 (see FIG. 5 which is a fragmentary cross section of view along line V-V of FIG. 4 of the guide ring 32) is divided by axial sidewalls 14 in a number of cooling channels 15 extending in the axial direction 37. Each of these cooling channels 15 is filled with the cooling structure 4, e.g. with the wire netting. The axial sidewalls 14 comprise cross-over holes 18 for allowing cooling fluid 5, e.g. air, to flow from one cooling channel 15 to a neighbouring cooling channel 15.

As the hot fluid wall 9 do not need to distribute to mechanical stability of the guide ring 32 it is much thinner than the cooling wall 2, whereby the cooling wall 2 gives the guide ring 32 a sufficient mechanical stability. The thin hot fluid wall 9 is mechanically supported by the axial sidewalls 14 so that it does not bend or deform more than a predetermined amount. The axial sidewalls 14 furthermore act as cooling fins or cooling ribs which even increase the surface contributing to the cooling by transmitting heat radiation. They also ensure that in the unlikely event of a local failure of the hot fluid wall 9 the guide ring 32 is still cooled in the areas covered by the other cooling channels 15.

FIG. 6 shows a cross sectional view of a further embodiment of a guide ring 32 similar to those described and shown in FIG. 2 and FIG. 4. The guide ring 32 includes a partition 35 for guiding the flow of cooling fluid 5 in the axial direction 37 aligned to the main axis 21 of the turbine 20. At the downstream end region 12 cooling fluid 5 is deflected and flows back along the axial direction 37 to the up stream end region 11. There the cooling fluid 5 exits the space 19 and the cooling structure 4 through an aperture 13. The partition 35 divides the space 19 in a subspace between the partition 35 and the cooling wall 2 and another subspace between the partition 35 and the hot fluid wall 9. As discussed above the space 19 and so the subspace separated by the partition 35 may include cooling channels 15 which are separated by axial sidewalls 14. By introducing the partition 35 the length of the flow path of the cooling fluid 5 in the cooling structure 4 can be increased so that the cooling fluid 5 is heated up slowly which leads to an even higher thermal separation between the hot fluid wall 9 and the cooling wall 2.

FIG. 7 shows a fragmentary and perspective view of a guide ring 32 extending along an axial direction 37, which is almost parallel to the main axis 21 of the turbine 20, and in a circumferential direction 36. The guide ring 32 is with respect to many features similar to those described in FIGS. 2, 4 and 6 and with respect to those features in particular the wall structure 7, 8 of the cooling wall 2, the hot fluid wall 9, the protective layer 10 and the materials used for the permeable cooling structures 4 it is referred to the description of these figures. The space 19 between the hot fluid wall 9 and the cooling wall 2 of the guide ring 32 according to FIG. 7 is separated in a number of cooling chambers 38. The cooling chambers 38 are formed by circumferential sidewalls 40 extending in the circumferential direction 36 and by axial sidewalls 14 as in FIG. 3 extending in the axial direction 37. In all of the cooling chambers 38 a cooling structure 4 is foreseen between the hot fluid wall 9 and the cooling wall 2. For the sake clarity only in one cooling chamber 38 the cooling structure 4 is shown in FIG. 7. The cooling chambers 38 located near the up stream end region 11 have one cooling fluid supply passage 16 in the axial direction 37 and one or more cooling fluid supply passages 16 in the circumferential direction 36. These cooling chambers 38 also have apertures 13 for cooling fluid 5 to exit the cooling chamber 38 arranged in a row along the circumferential direction 36. So in these cooling chambers 38 located near the up stream end region 11 the cooling fluid 5 flows almost in the axial direction 37 before exiting the cooling chamber 38. The cooling chambers 38 arranged in the centre of the guide ring 32 with respect to the axial direction 37 and those arranged near the down stream end region 12 have a number of rows of cooling fluid supply passages 16 both in the axial direction 37 and in the circumferential direction 36. They also have apertures 13 in the hot fluid wall 9 distributed in the circumferential direction 36 as well as in the axial direction 37. The arrangement of cooling fluid supply passages 16 as well as apertures 13 leads to a flow of cooling fluid 5 directed perpendicular to the cooling wall 2 and to the hot fluid wall 9. So in these cooling chambers 38 the temperature of the cooling fluid 5 is as low as possible, because cooling fluid 5 is supplied over the whole surface area of the cooling wall 2 and cooling fluid 5 after being heated up exits the cooling structure 4 all over the hot fluid surface 3. This leads to a high cooling efficiency by using a low amount cooling fluid 5. Furthermore, the apertures 13 are positioned off the cooling fluid supply passages 16 so that also an impingement cooling of the hot fluid wall 9 can be obtained.

Figure 8:
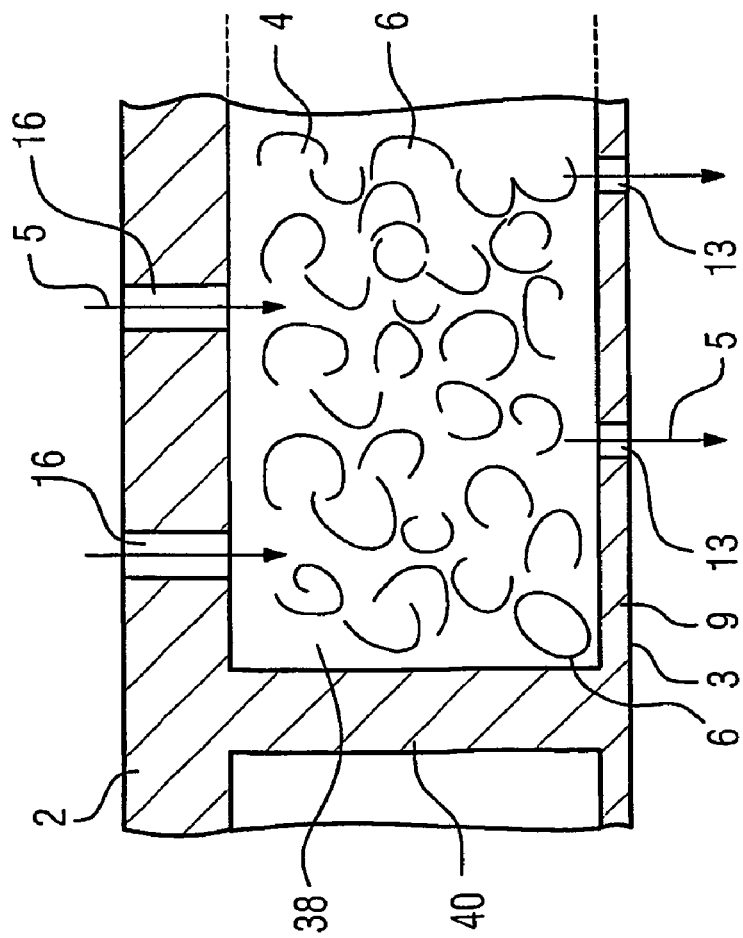
FIG. 8 is an enlarged fragmentary, cross-sectional view of the guide ring according to FIG. 7.

FIG. 8 shows an enlarged view of a cooling chamber 38 of the guide ring 32 of FIG. 7. The apertures 13 are positioned with an offset with respect to the cooling fluid supply passages 16. Cooling fluid 5 flows in a direction perpendicular to the cooling wall 2 through the porous cooling structure 4. Due to the porosity of the cooling structure 4 a number of cooling surfaces 6 are formed from which heat is transferred by radiation to other cooling surfaces 6.

Figure 9:
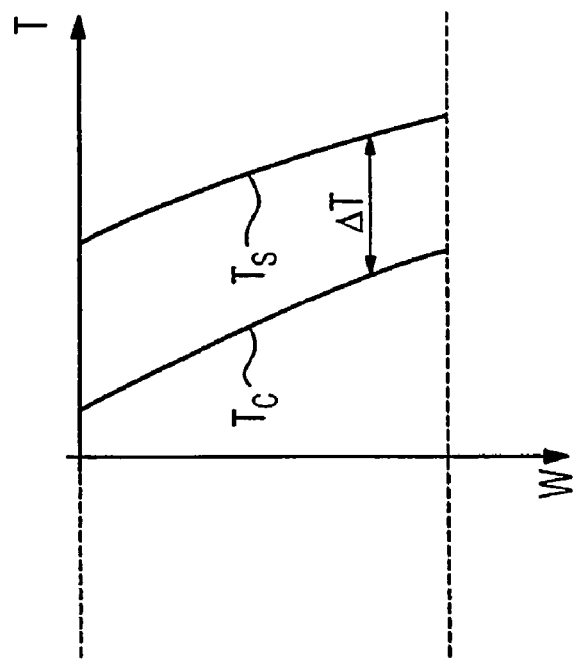
FIG. 9 is a plot diagram showing schematically the temperature profile within the guide ring according to FIG. 8.

In FIG. 9 the temperature T over the width W of the coolable segment 1 e.g. the guide ring 32 is shown. The temperature of both the cooling fluid $T_C$ and the temperature $T_S$ of the cooling structure 4 are lowest at the cooling wall 2. The temperature difference $\Delta T$ between the temperature $T_s$ of the cooling structure 4 and the temperature $T_C$ of the cooling fluid 5 is almost constant over the width W of the cooling structure 4. This is due to the fact that the cooling fluid 5 as well as the cooling structure 4 have a temperature, which increases from the cooling wall 2 to the hot fluid surface 3.

LIST OF REFERENCE NUMERALS

| | |
|---|---|
| 1 | coolable segment |
| 2 | wall |
| 3 | hot fluid surface |
| 4 | cooling structure |
| 5 | cooling fluid |
| 6 | cooling surfaces |
| 7 | wall structure |
| 8 | hook-like end-portion |
| 9 | hot fluid wall |
| 10 | protective layer |
| 11 | upstream end region |
| 12 | down stream end region |
| 13 | aperture |
| 14 | axial sidewall |
| 15 | cooling channel |
| 16 | supply passage |
| 17 | access cover |
| 18 | cross-over holes |
| 19 | space between cooling wall and hot gas wall |
| 20 | turbomachinery, combustion turbine |
| 21 | main axis of turbine |
| 22 | compressor |
| 23 | combustion chamber |
| 24 | turbine section |
| 25 | guide blades, vanes |
| 26 | rotating blades |
| 27 | shroud of vane |
| 28 | inner turbine housing |
| 29 | hot gas, hot fluid |
| 30 | hot gas channel of turbine section |
| 31 | turbine rotor |
| 32 | guide ring |
| 33 | air |
| 34 | burner |
| 35 | partition |
| 36 | circumferential direction |
| 37 | axial direction |
| 38 | cooling chamber |
| 39 | combustion chamber wall |
| 40 | circumferential sidewall |
| W | width of segment |
| T | temperature along width |
| $T_C$ | temperature of cooling fluid |
| $T_S$ | temperature of cooling structure |

The invention claimed is:

1. A coolable segment for a turbomachine operated with a hot fluid, the segment comprising:
   a cooling wall extending in an axial direction and a circumferential direction orthogonal to said axial direction;
   a hot fluid wall generally parallel with the cooling wall, the hot fluid wall comprising an inner surface exposed to said hot fluid;
   a cooling chamber formed between the cooling wall and the hot fluid wall;
   a first cooling fluid supply passage for supplying a cooling fluid into the cooling chamber;
   a first cooling fluid exit aperture for releasing the cooling fluid from the cooling chamber;
   a cooling structure comprising a fibrous or porous material filling the cooling chamber between said cooling wall and said hot fluid wall so that the cooling fluid flowing through the cooling chamber must pass through the cooling structure, the cooling structure being permeable to the cooling fluid and providing cooling surfaces for cooling by heat transmission through radiation;

a partition wall generally parallel with the cooling wall, the partition wall dividing the cooling chamber into a cooling flow labyrinth between the hot fluid wall and the cooling wall;

the first cooling fluid supply passage opening into the cooling chamber at a starting point of the labyrinth; and the first cooling fluid exit aperture opening into the cooling chamber at an ending point of the labyrinth, such that the cooling flow is routed along an inner surface of the cooling wall and an outer surface of the partition wall in a first cooling flow direction then is reversed by the labyrinth and routed along an outer surface of the partition wall and an inner surface of the hot fluid wall in a second cooling flow direction.

2. A coolable segment according to claim 1, wherein said cooling structure comprises a netting of a heat conducting material.

3. A coolable segment according to claim 1, wherein said cooling structure comprises a randomly porous material.

4. A coolable segment according to claim 1, wherein said cooling structure comprises a heat conducting material.

5. A coolable segment according to claim 1, wherein said cooling structure is connected to said cooling wall to allow heat transfer from the cooling structure into the cooling wall.

6. A coolable segment according to claim 1, wherein the cooling chamber is elongated generally axially, and it guides the cooling fluid to flow generally axially, and further comprising an additional generally axially elongated cooling chamber, the two cooling chambers separated by a generally axial sidewall.

7. A coolable segment according to claim 1, wherein the first cooling fluid supply passage opens through said cooling wall for the cooling fluid to enter said cooling structure.

8. A coolable segment according to claim 7, further comprising a second cooling fluid supply passage opening through the cooling wall into the cooling chamber, the first and second cooling fluid supply passages spaced generally axially from each other, and wherein the first and second cooling fluid supply passages act as a throttle performing a higher pressure loss than within the cooling structure.

9. A coolable segment according to claim 1, wherein said cooling fluid supply passage acts as a throttle performing a higher pressure loss than within the cooling structure.

10. A coolable segment according to claim 1, further comprising a heat shield element for a combustion chamber, and a shroud portion of a turbine vane or a guide ring segment for forming a wall portion opposing rotating turbine blades.

11. A coolable segment according to claim 1, for use in a combustion turbine.

12. A coolable segment according to claim 1, wherein the hot fluid has upstream and downstream flow directions, the first cooling fluid supply passage is located in an upstream portion of the coolable segment, the first cooling flow direction is generally downstream, the cooling fluid exit aperture is located in an upstream portion of the coolable segment, and the second cooling flow direction is generally upstream.

13. A combustion turbine, comprising:

a hot-gas flow region for receiving a flow of a hot gas;

a wall structure surrounding said hot-gas flow region the wall structure comprising a coolable segment with a cooling wall extending in an axial direction and in a circumferential direction orthogonal to said axial direction;

a hot fluid surface wall to be exposed to said hot gas;

a cooling structure comprising a fibrous or porous material filling a cooling chamber between said cooling wall and said hot fluid surface wall so that a cooling fluid flowing through the cooling chamber must pass through the cooling structure for cooling by heat transmission through radiation;

a partition wall generally parallel with the cooling wall, the partition wall dividing the cooling chamber into a cooling flow labyrinth between the hot fluid surface wall and the cooling wall;

a cooling fluid supply passage opening into the cooling chamber at a starting point of the labyrinth; and a cooling fluid exit aperture opening into the cooling chamber at an ending point of the labyrinth, such that the cooling flow is routed along an inner surface of the cooling wall and an outer surface of the partition wall in a first cooling flow direction then is reversed by the labyrinth and routed along an outer surface of the partition wall and an inner surface of the hot fluid surface wall in a second cooling flow direction.

* * * * *